CYCLICALLY REPEATING SOUND PRODUCING DEVICE

Filed July 26, 1965 5 Sheets-Sheet 1

INVENTOR

Dorothea M. Weitzner

BY Polachek & Saulsbury

ATTORNEYS.

CYCLICALLY REPEATING SOUND PRODUCING DEVICE

Filed July 26, 1965 5 Sheets-Sheet 2

INVENTOR
Dorothea M. Weitzner
By Polachek & Saulsbury
ATTORNEYS

INVENTOR

Dorothea M. Weitzner

BY Polachek & Saulsbury

ATTORNEYS

Nov. 19, 1968 D. M. WEITZNER 3,412,197

CYCLICALLY REPEATING SOUND PRODUCING DEVICE

Filed July 26, 1965 5 Sheets-Sheet 4

INVENTOR

Dorothea M. Weitzner

BY Polachek & Saulsbury

ATTORNEYS

INVENTOR
Dorothea M. Weitzner
BY
Glaschek & Saulsbury
ATTORNEYS

United States Patent Office 3,412,197

Patented Nov. 19, 1968

3,412,197
CYCLICALLY REPEATING SOUND PRODUCING DEVICE

Dorothea M. Weitzner, 8 E. 62nd St., New York, N.Y. 10021

Filed July 26, 1965, Ser. No. 474,674
12 Claims. (Cl. 84—1.03)

This invention concerns a cyclically repeating sound producing device. The invention has a variety of applications. It can be used as an electronic metronome, as a mechanical music producing device, as an aid to music composition, as an amusement and entertainment device, etc. The device includes a cylindrical casing on the front or top face of which is a plurality of circular rings. Slidably disposed between the rings and frictionally engaged therewith are sliders which can be moved to different positions circumferentially of the rings. The sliders remain where set until they are manually moved to other positions. The sliders have projecting fingers which engage and operate switches mounted on a rotating arm or bar inside the casing behind or below the rings. The rotating arm carries magnetic heads, one for each switch. The magnetic heads pass over circular sound tracks recorded on the magnetic face of a sound disk in the casing. The magnetic heads are connected in circuit with the respective switches and with an electronic amplifier. Connected to the amplifier is a loudspeaker installed in the device. The sliders can be moved axially of the casing to positions where the switches passing them are not operated. The rotating arm is driven at a constant speed by a motor which has a speed control so that the motor will drive the arm at any one of a number of predetermined speeds. By the arrangement described, it is possible to set the sliders so that a multiplicity of sounds may be simultaneously or sequentially sounded and cyclically repeated. The device is arranged so that it can be held in the hand while it is being set and operated or it can be stood on a table or other support while in use.

It is, therefore, one object of the invention to provide a cyclically repeating sound producing device in which the sounds to be produced are determined by locating movable sliders to different positions circumferentially of the face of the device.

A further object is to provide a device as described, wherein the sounds are produced electromagnetically from a plurality of circular magnetic sound tracks over which rotates an arm carrying magnetic pickup heads coacting with the sound tracks and carrying switches coacting with the sliders.

Other objects are to provide a device as described, wherein the sliders are movable axially of the device for temporarily deactivating them; therein the rotatable arm is driven by a motor energized by batteries in the device; wherein a transistor amplifier and loudspeaker are included in the device and connected in circuit with the batteries and the magnetic pickup heads; and wherein the device can be operated while held in one's hand or standing on a support.

Further objects are to provide a device which can be used as an electronic metronome, as a cyclically repeating musical tone producer as an amusement device, and for other applications which will readily occur to users thereof.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

Figures 1, 2:
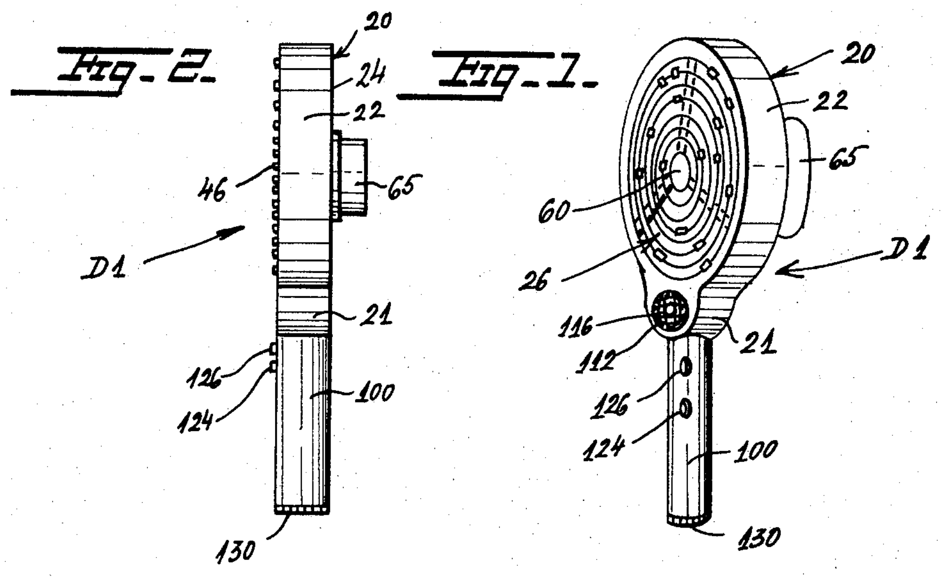
FIG. 1 is a perspective view of a device embodying the invention.
FIG. 2 is a side elevational view of the device of FIG. 1.
Figure 5:
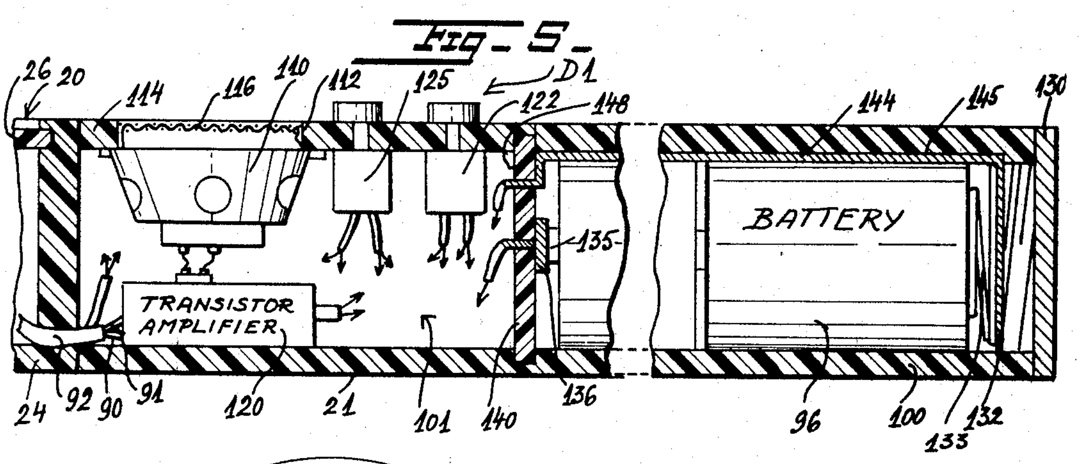
FIG. 5 is a longitudinal sectional view taken on line 5—5 of FIG. 3, parts being broken away.

Referring first to FIGS. 1–5, there is shown a cyclically repeating sound producing device D1 having generally cylindrical casing 20. The casing has a cylindrical peripheral wall 22, a flat, circular back wall 24 and open front. In a circumferential groove 25 formed on the inner side of wall 22 at the open front of the casing is a framework 26; see FIGS. 3, 4. This framework has a multiplicity of concentrically disposed flat arcuate ribs 28 connected to each other radially of the framework by narrow webs 30. The ribs define a multiplicity of concentric circular rings 29 spaced apart radially and connected by the radial webs 30. It is preferred that inner facing edges 31 of the ribs be roughened, knurled or serrated. The framework forms an integral frame structure. It may be made of metal or plastic material.

Circular spaces S are defined between the rings, the spaces being interrupted only by the narrow webs 30. In the spaces S between adjacent ribs are disposed sliders 40. Each slider as best shown in FIGS. 3, 4, 6 and 7 has a body in the form of a rectangular block 42 with roughened or knurled flat opposite sides 44. These sides frictionally engage the roughened edges 31 of the ribs so that the sliders will remain wherever set circumferentially of the casing or framework. On the top or outer side 45 of each block is a knob or handle 46 by means of which the slider can be conveniently manually moved. Straight, flat flanges 48, 49 extend laterally outward of both sides 44 at top and bottom ends thereof. The sides 44 are longer than the thicknesses of the ribs. The ribs are sufficiently flexible so that the adjacent ribs can be bent apart to insert the sliders into spaces S. Then the sliders will be snugly engaged between adjacent ribs. The sliders can be moved axially of the casing and framework to an outer or forward position where flanges 49 abut the undersides or inner sides of the ribs, and the sliders can be moved axially inward of the framework and casing to an inner position where the outer flanges 48 abut the upper sides or outer sides of ribs 28. Projecting outwardly of the inner or underside 51 of each slider is a short finger 50 with a rounded free end. One, two or more sliders 40 can be disposed in each space S between each pair of arcuate ribs.

Figures 4, 6, 7:
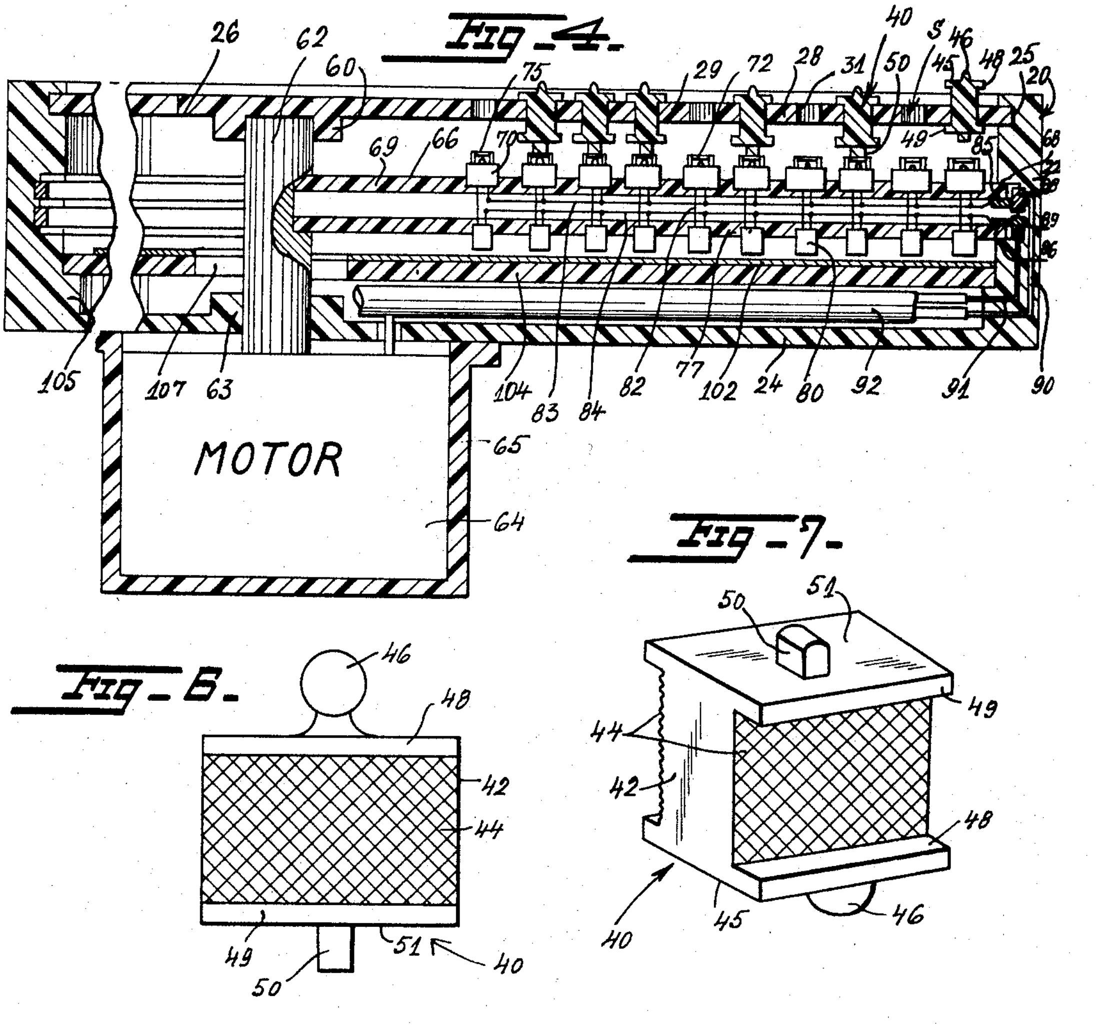
FIG. 4 is a cross sectional view taken on line 4—4 of FIG. 3, parts being broken away.
FIG. 6 is an enlarged side view of a slider employed in the invention.
FIG. 7 is a perspective view of a slider in inverted position.

At the center of the framework 26 is an axially depending boss 60 in which is rotatably journaled a shaft 62 extending axially of the casing through lower boss 63; see FIG. 4. The shaft is driven by motor 64. The motor is housed in a cylindrical cup-like member 65 secured at the back of the casing and centrally located thereat.

Figure 8:
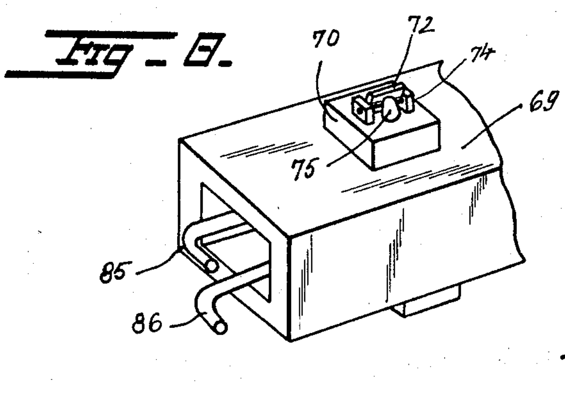
FIG. 8 is an enlarged fragmentary perspective view of the rotary arm of the device.

Securely fitted to the shaft 62 and extending radially therefrom is a hollow, rectangular bar or arm 66. The outer end of the arm is slidably guided for rotational movement in a circumferential groove 68 formed in the inner side of casing wall 22. On the upper side 69 of the arm is a plurality of spaced microswitches 70. Each switch as best shown in FIG. 8 has a movable lever 72 pivoted on ears 74. The lever bears on puhsbutton 75 spring biased outwardly to raise the lever to inclined position. The levers 72 of the switches are inclined so that they will be depressed by the fingers 50 of sliders 40 when the sliders are lowered or fully inserted into the casing. The switches are respectively aligned with spaces S radially of the framework.

Underneath the arm 66 attached to its lower side 77 is a plurality of magnetic pickup heads 80. The heads are spaced apart longitudinally of the arm 66 or radially of casing 20. The switches and heads are connected together by wires 82. They are also connected to wires 83, 84 which terminate in spring wiper contacts 85, 86. These contacts respectively contact two electrically conductive metal rings 88, 89 fitted inside of groove 68. The rings are connected via lead wires 90, 91 to a cable 92. This cable also contains wires which conduct electrical current from batteries 96 loacted in the cylindrical handle 100 of the device; see FIG. 5.

Figure 9:
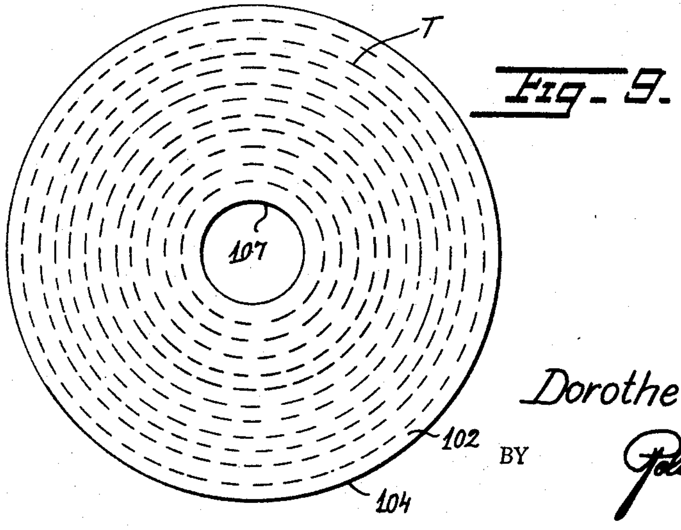
FIG. 9 is a front view of a sound disk employed in the invention.
Figure 3:
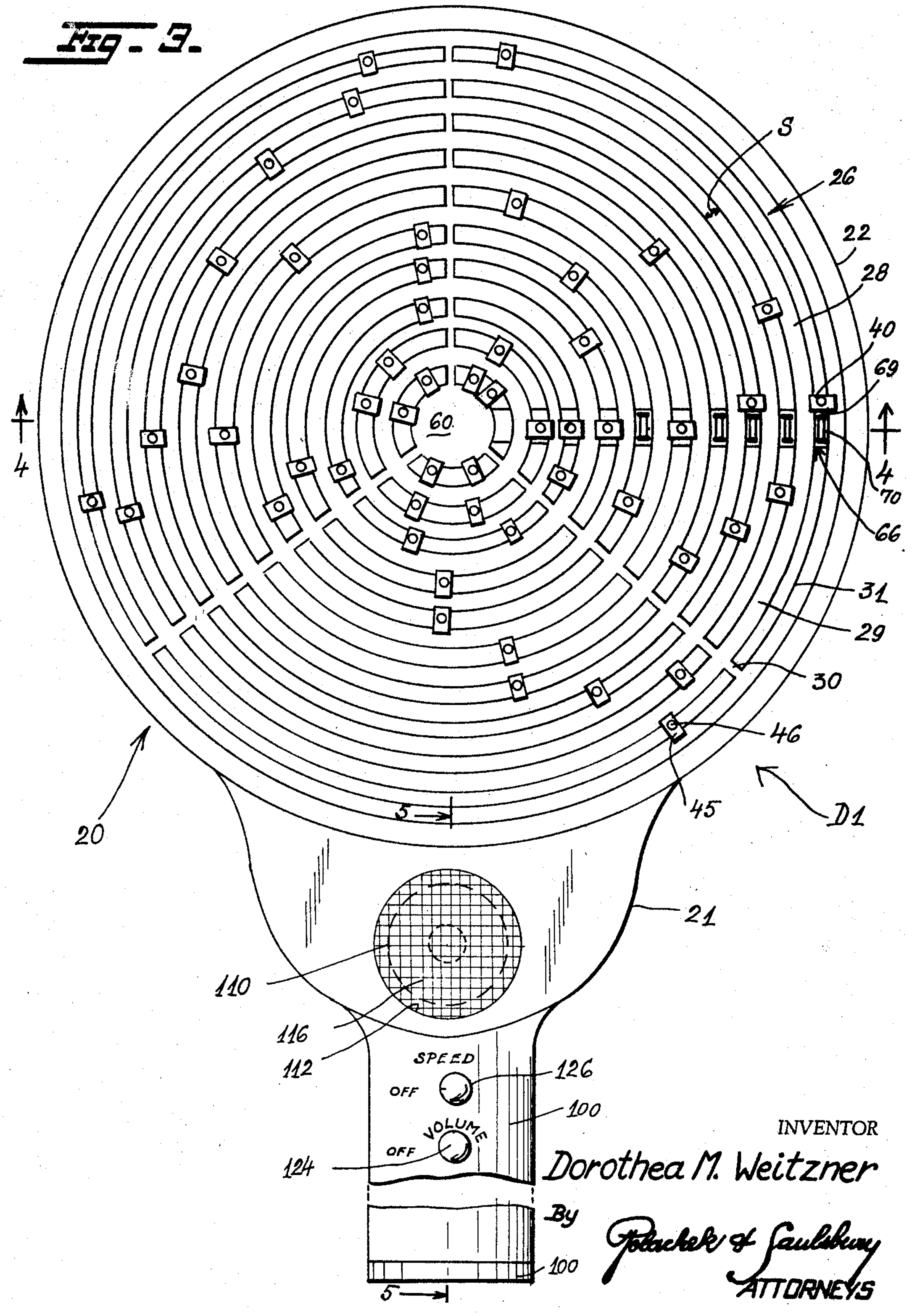
FIG. 3 is an enlarged front view of the device of FIG. 1, parts being broken away.

The magnetic pickup heads are aligned with circular, concentric magnetic sound tracks T recorded on a magnetic coating 102 of a circular disk 104 seated on a circumferential seat 105 near the bottom wall of the casing; see FIGS. 3 and 9. Sustained musical or nonmusical sounds may be recorded on tracks T. Disk 104 has a central hole 107 through which extends shaft 62.

The casing 20 has a flat, hollow, tapered radial extension 21 to which cylindrical handle 100 is attached. In the casing extension 21 is a chamber 101; see FIG. 5. In this chamber is mounted a small loudspeaker 110 opening into a hole 112 in the front wall 114 of the casing extension. A protective screen 116 is secured in hole 112 to protect the loudspeaker. The loudspeaker is electrically connected to the output of a transistor amplifier 20. To the input of the amplifier is connected wires 90 and 91. Also connected to the amplifier is an ON-OFF switch speed control assembly 125 is connected electrically to motor 64. This assembly has a control knob 126 on wall 114.

A plurality of batteries 96 are disposed in axial alignment in the cylindrical handle. At the bottom or free end of the handle is a screw plug 130. An electrically conductive removable plate 132 is abutted to the plug and a coil spring 133 abuts the plate 132 and applies pressure to the electrically negative end of the serially arranged batteries 96. The positive terminal 135 of the uppermost battery contacts a centrally located lug 136 supported in insulation plate 140 at the upper end of the handle. Wire 142 is connected to lug 136. A narrow metal strip 144 is contacted by plate 132. This strip extends longitudinally of the handle in a groove 145 in its inner side. Strip 144 terminates at a lug 148 to which wire 150 is connected. Wires 142 and 150 are connected to the transistor amplifier and motor in electric circuit C shown in FIG. 10 to which reference is now made.

Circuit C shows motor 64 connected in series with ON-OFF switch 160, speed control 162 and batteries 96. The coils 164 of magnetic pickup heads 80 each have one terminal connected to wire 84 which is connected to one input terminal of amplifier 120 via volume control 166. The other terminal of each coil 164 is connected to one contact 168 of an associated switch 70. The other contact 170 of each switch is connected to wire 83 which is connected to the other input terminal of amplifier 120. Switches 70 are normally open pushbutton switches. ON-OFF switch 172 is connected to the power supply circuit of amplifier 120. Loudspeaker 110 is connected to the output of the amplifier.

In operation of the device D1 and circuit C, the user will move the sliders 40 to any desired positions on framework 26. Those sliders which are to be effective to operate switches 70 will push inwardly and those sliders which are to be cleared by the switches as they move with arm 66 will be pulled outwardly. The frictional engagement of the sides of the sliders with the edges of the ribs of the framework holds the sliders in place. Then both knobs 124 and 126 are turned to close switches 160 and 170. This starts the motor 64 and turns on the amplifier. The arm 66 rotates and as each switch 70 reaches a projecting finger of a lowered slider 40 in its circular path the switch closes and the associated pickup head 80 picks up a magnetically recorded sound from its associated sound track T. A single sound or two or more sounds simultaneously may be picked up magnetically by heads 80 and passed as electrical pulses to the amplifier where the sounds are reproduced audibly.

If the sounds recorded on the respective tracks T constitute a musical scale, then the device can be used as an electronic music producing device depending on the positioning of the sliders 40. The several rings 29 of the framework will represent a mechanical musical scale and the sliders will represent mechanical notes on the scale. Although ten rings and a limited number of sliders have been provided a greater or lesser number of rings and sliders may be employed.

The sounds will be reproduced cyclically over and over until the control knobs are turned to the OFF position.

Figures 10, 11:
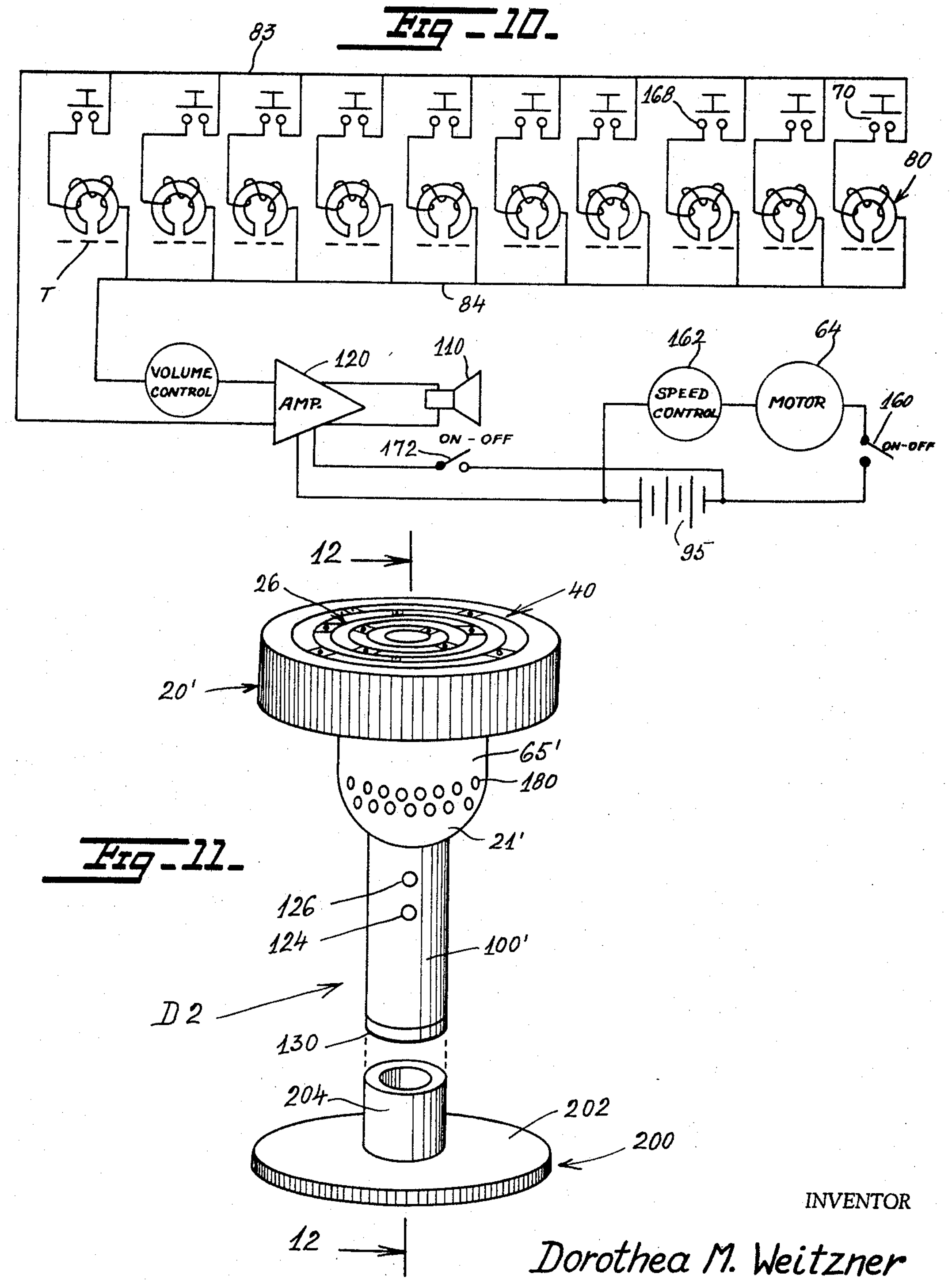
FIG. 10 is a diagram of the electrical system of the device.
FIG. 11 is a perspective view of another device embodying the invention.
Figure 12:
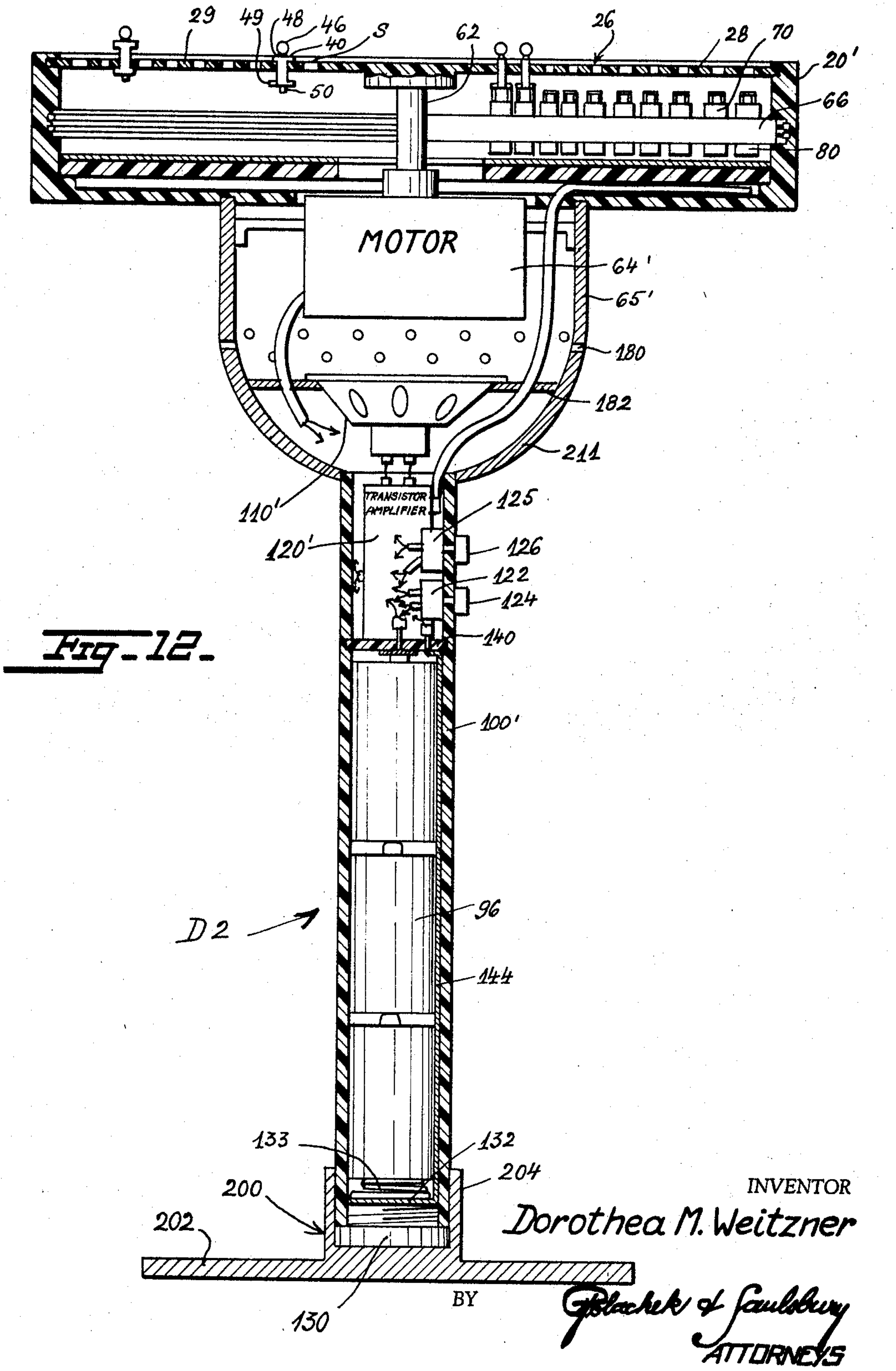
FIG. 12 is an enlarged longitudinal sectional view taken on line 12—12 of FIG. 11.

In FIGS. 11 and 12 is shown another device D2 which is basically similar to device D1 and corresponding parts are identically numbered. In this embodiment of the invention cylindrical handle 100′ is disposed axially of the motor housing 65′ and cylindrical casing 20′ on which is mounted framework 26 carrying sliders 40. The handle is attached to spherically curved bottom 21′ of casing housing 65′. In the bottom of extension 65′ is located loudspeaker 110′ which radiates sound outwardly through holes 180 at the lower part of the motor housing 65′. The loudspeaker is supported on a partition 182 in the casing extension 65′. Electrical connections of the parts are the same as described in connection with device D1 and circuit C. The device D2 has the feature that sound is radiated omnidirectionally all around the device instead of unidirectionally in device D1.

A stand 200 can be provided for supporting the device D2. This stand has an annular base plate 202 on which a centrally located cylindrical receptacle 204 which receives the lower end of the handle 100′ is shown. The stand will support the device in axially vertical position on a table or other support. The stand 200 can be used in the same way to support device D1 in a vertical position.

Both forms of the device can be made up in various sizes and used for various purposes where cyclically repeated different selected sounds are required to be emitted at controllably different set speeds and different set volumes.

While I have illustrated and described the preferred embodiments of my invention, it is to be understood that I do not limit myself to the precise constructions herein disclosed and that various changes and modifications may be made within the scope of the invention as defined in the appended claims.

What is claimed is:

1. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, and a magnetic record medium in the casing at the back thereof located for tracking by said heads to pick up magnetically recorded sounds therefrom.

2. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, magnetic record medium in the casing at the back thereof located for tracking by said heads to pick up magnetically recorded sounds therefrom, an amplifier carried by the casing, said switches and pickup heads being connected in circuit with said amplifier, and a loudspeaker carried by the casing and connected to the amplifier for reproducing the recorded sounds picked up by the magnetic heads and applied to the amplifier.

3. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, magnetic record medium in the casing at the back thereof located for tracking by said heads to pick up magnetically recorded sounds therefrom, an amplifier carried by the casing, said switches and pickup heads being connected in circuit with said amplifier, and a loudspeaker carried by the casing and connected to the amplifier for reproducing the recorded sounds picked up by the magnetic heads and applied to the amplifier, a hollow handle attached to the casing and serving as a support therefor, said handle having a compartment therein for containing batteries, and a power supply circuit means terminating in the handle for drawing power from the batteries, said power supply circuit means being connected to said motor and said amplifier for energizing the same.

4. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, magnetic record medium in the casing at the back thereof located for tracking by said heads to pick up magnetically recorded sounds therefrom, an amplifier carried by the casing, said switches and pickup heads being connected in circuit with said amplifier, and a loudspeaker carried by the casing and connected to the amplifier for reproducing the recorded sounds picked up by the magnetic heads and applied to the amplifier, a hollow handle attached to the casing and serving as a support therefor, said handle having a compartment therein for containing batteries, and a power supply circuit means terminating in the handle for drawing power from the batteries, said power supply circuit means being connected to said motor and said amplifier for energizing the same, said casing having an axial extension at the back thereof, said motor being disposed in said extension, said casing having a radial extension, said loudspeaker being located in said radial extension of the casing to direct sound outwardly unidirectionally axially of the casing.

5. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, magnetic record medium in the casing at the back thereof located for tracking by said heads to pick up magnetically recorded sounds therefrom, an amplifier carried by the casing, said switches and pickup heads being connected in circuit with said amplifier, and a loudspeaker carried by the casing and connected to the amplifier for reproducing the recorded sounds picked up by the magnetic heads and applied to the amplifier, a hollow handle attached to the casing and serving as a support therefor, said handle having a compartment therein for containing batteries, and a power supply circuit means terminating in the handle for drawing power from the batteries, said power supply circuit means being connected to said motor and said amplifier for energizing the same, said casing having an axial extension at the back thereof, said motor being disposed in said extension, said casing having a radial extension, said loudspeaker being located in said radial extension of the casing to direct sound outwardly unidirectionally axially of the casing, said handle being secured to the radial extension of the casing for supporting the casing in an axially horizontal position perpendicular to the axis of said handle.

6. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, magnetic record medium in the casing at the back thereof located for tracking by said heads to pick up magnetically recorded sounds therefrom, an amplifier carried by the casing, said switches and pickup heads being connected in circuit with said amplifier, and a loudspeaker carried by the casing and connected to the amplifier for reproducing the recorded sounds picked up by the magnetic heads and applied to the amplifier, a hollow handle attached to the casing and serving as a support therefor, said handle having a compartment therein for containing batteries, and a power supply circuit means terminating in the handle for drawing power from the batteries, said power supply circuit means being connected to said motor and said amplifier for energizing the same, said casing having an axial extension at the back thereof, said loudspeaker being located in said axial extension of the casing for radiating sound omnidirectionally of the casing.

7. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, magnetic record medium in the casing at the back thereof located for tracking by said heads to pick up magnetically recorded sounds therefrom, an amplifier carried by the casing, said switches and pickup heads being connected in circuit with said amplifier, and a loudspeaker carried by the casing, said switches and pickup heads being connected in circuit with said amplifier, and a loudspeaker carried by the casing and connected to the amplifier for reproducing the recorded sounds picked up by the magnetic heads and applied to the amplifier, a hollow handle attached to the casing and serving as a support therefor, said handle having a compartment therein for containing batteries, and a power supply circuit means terminating in the handle for drawing power from the batteries, said power supply circuit means being connected to said motor and said amplifier for energizing the same, said casing having an axial extension at the back thereof, said loudspeaker being located in said axial extension of the casing for radiating sound omnidirectionally of the casing, said handle being secured to said axial extension of the casing for supporting the casing in an axially vertical position in axial alignment with said handle.

8. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, and a magnetic record medium in the casing at the back thereof located for tracking by said heads to pick up recorded sounds magnetically therefrom, each of said sliders having a rectangular body with flat roughened sides, facing edges of said rings being roughened to engage frictionally with the flat roughened sides, said sliders having end flanges spaced apart a greater distance than the thickness of the rings so that the sliders are movable axially of the casing between said flanges between innermost and outermost positions, whereby the projecting portions of the sliders are cleared by the switches in their said outermost positions and whereby the switches are actuated by said projecting portions of the sliders in their said innermost positions.

9. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, magnetic record medium in the casing at the back thereof located for tracking by said heads to pick up magnetically recorded sounds therefrom, an amplifier carried by the casing, said switches and pickup heads being connected in circuit with said amplifier, and a loudspeaker carried by the casing and connected to the amplifier for reproducing the recorded sounds picked up by the magnetic heads and applied to the amplifier, a hollow handle attached to the casing and serving as a support therefor, said handle having a compartment therein for containing batteries, and a power supply circuit means terminating in the handle for drawing power from the batteries, said power supply circuit means being connected to said motor and said amplifier for energizing the same, each of said sliders having a rectangular body with flat roughened sides, facing edges of said rings being roughened to engage frictionally with the flat roughened sides, said sliders having end flanges spaced apart a greater distance than the thickness of the rings so that the sliders are movable axially of the casing between said flanges between innermost and outermost positions, whereby the projecting portions of the sliders are cleared by the switches in their said outermost positions and whereby the switches are actuated by said projecting portions of the sliders in their said innermost positions.

10. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, magnetic record medium in the casing at the back thereof located for tracking by said heads to pick up magnetically recorded sounds therefrom, an amplifier carried by the casing, said switches and pickup heads being connected in circuit with said amplifier, and a loudspeaker carried by the casing and connected to the amplifier for reproducing the recorded sounds picked up the magnetic heads and applied to the amplifier, a hollow handle attached to the casing and serving as a support therefor, said handle having a compartment therein for containing batteries, and a power supply circuit means terminating in the handle for drawing power from the batteries, said power supply circuit means being connected to said motor and said amplifier for energizing the same, said casing having an axial extension at the back thereof, said motor being disposed in said extension, said casing having a radial extension, said loudspeaker being located in said radial extension of the casing to direct sound outwardly unidirectionally axially of the casing, each of said sliders having a rectangular body with flat roughened sides, facing edges of said rings being roughened to engage frictionally with the flat roughened sides, said sliders having end flanges spaced apart a greater distance than the thickness of the rings so that the sliders are movable axially of the casing between said flanges between innermost and outermost positions, whereby the projecting portions of the sliders are cleared by the switches in their said outermost positions and whereby the switches are actuated by said projecting portions of the sliders in their said innermost positions.

11. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, magnetic record medium in the casing at the back thereof located for tracking by said heads to pick up magnetically recorded sounds therefrom, an amplifier carried by the casing, said switches and pickup heads being connected in circuit with said amplifier, and a loudspeaker carried by the casing and connected to the amplifier for reproducing the recorded sounds picked up by the magnetic heads and applied to the amplifier, a hollow handle attached to the casing and serving as a support therefor, said handle having a compartment therein for containing batteries, and a power supply circuit means terminating in the handle for drawing power from the batteries, said power supply circuit means being connected to said motor and said amplifier for energizing the same, said casing having an axial extension at the back thereof, said loudspeaker being located in said axial extension of the casing for radiating sound omnidirectionally of the casing, each of said sliders having a rectangular body with flat roughened sides, facing edges of said rings being roughened to engage frictionally with the flat roughened sides, said sliders having end flanges spaced apart a greater distance than the thickness of the rings so that the sliders are movable axially of the casing between said flanges between innermost and outermost positions, whereby the projecting portions of the sliders are cleared by the switches in their said outermost positions and whereby the switches are actuated by said projecting of the sliders in their said innermost positions.

12. A device for cyclically producing sounds, comprising a casing, said casing having a cylindrical wall, a closed back and open front, a framework set in the open front of the casing, said framework having a plurality of concentric rings supported in radially spaced positions to define a plurality of circular spaces therebetween, a plurality of sliders movably disposed between said rings in movable relation along said spaces, said sliders having projecting portions extending radially inward of the casing, a motor supported axially of the casing at the back thereof, said motor having a shaft extending axially into the casing, an arm extending radially of the shaft and carrying a plurality of switches, said switches being spaced apart longitudinally of the arm and aligned with the respective circular spaces for actuation respectively by said projecting portions of the sliders, magnetic recording pickup heads carried by said arm in spaced positions longitudinally of the arm and facing the back of the casing, magnetic record medium in the casing at the back thereof located for tracking by said heads to pick up magnetically recorded sounds therefrom, an amplifier carried by the casing, said switches and pickup heads being connected in circuit with said amplifier, and a loudspeaker carried by the casing and connected to the amplifier for reproducing the recorded sounds picked up by the magnetic heads and applied to the amplifier, a hollow handle attached to the casing and serving as a support therefor, said handle having a compartment therein for containing batteries, and a power supply circuit means terminating in the handle for drawing power from the batteries, said power supply circuit means being connected to said motor and said amplifier for energizing the same, volume and speed controls mounted on said handle, said volume control being connected in circuit with the amplifier to control sound volume produced by the loudspeaker, said speed control being connected in circuit with the motor to control the speed thereof.

No references cited.

ARTHUR GAUSS, *Primary Examiner.*

J. D. FREW, *Assistant Examiner.*